(12) United States Patent
Cohen et al.

(10) Patent No.: US 7,921,883 B2
(45) Date of Patent: Apr. 12, 2011

(54) HYDROGEN DISPENSER WITH USER-SELECTABLE HYDROGEN DISPENSING RATE ALGORITHMS

(75) Inventors: Joseph Perry Cohen, Bethlehem, PA (US); David John Farese, Riegelsville, PA (US); Keith David Gourley, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1127 days.

(21) Appl. No.: 11/448,393

(22) Filed: Jun. 7, 2006

(65) Prior Publication Data

US 2008/0000542 A1    Jan. 3, 2008

(51) Int. Cl.
*B65B 31/04* (2006.01)
*G05B 15/00* (2006.01)

(52) U.S. Cl. ............. 141/49; 141/4; 141/95; 141/97; 700/83

(58) Field of Classification Search ............ 141/4, 49, 141/95, 97; 700/83
See application file for complete search history.

(56) References Cited

U.S. PATENT DOCUMENTS

| | | | |
|---|---|---|---|
| 5,259,424 A * | 11/1993 | Miller et al. | ............. 141/4 |
| 5,597,020 A | 1/1997 | Miller et al. | |
| 5,901,758 A | 5/1999 | Hwang et al. | |
| 6,098,879 A | 8/2000 | Terranova | |
| 6,213,393 B1 | 4/2001 | Streicher et al. | |
| 6,598,624 B2 | 7/2003 | Togasawa et al. | |
| 6,619,336 B2 | 9/2003 | Cohen et al. | |
| 6,708,573 B1 | 3/2004 | Cohen et al. | |
| 6,779,568 B2 | 8/2004 | Borck | |
| 6,810,925 B2 | 11/2004 | Graham et al. | |
| 2005/0056661 A1* | 3/2005 | Casamatta et al. | ............. 222/3 |
| 2005/0178463 A1 | 8/2005 | Kountz et al. | |
| 2005/0186117 A1* | 8/2005 | Uchiyama et al. | ............. 422/91 |
| 2007/0169837 A1* | 7/2007 | Cohen et al. | ............. 141/102 |

FOREIGN PATENT DOCUMENTS

| | | |
|---|---|---|
| DE | 197 05 601 A1 | 8/1998 |
| DE | 102 18 678 A1 | 11/2002 |
| DE | 102 41 688 A1 | 5/2003 |
| EP | 1 331 289 A1 | 7/2003 |
| EP | 1 398 603 A2 | 3/2004 |
| EP | 1 452 794 A2 | 9/2004 |
| JP | 02082459 A * | 3/1990 |
| WO | 01/77574 A1 | 10/2001 |
| WO | WO 2004/050798 A2 | 6/2004 |

* cited by examiner

*Primary Examiner* — Alexa D. Neckel
*Assistant Examiner* — Nicholas A. Smith
(74) *Attorney, Agent, or Firm* — Bryan C. Hoke, Jr.

(57) ABSTRACT

A hydrogen dispenser comprises a programmable controller and a user interface operably connected to the programmable controller. The programmable controller has a plurality of user-selectable hydrogen dispensing rate algorithms. The user interface offers the plurality of user-selectable hydrogen dispensing rate algorithms and is used for setting a user-selected dispensing rate algorithm from among the plurality of user-selectable hydrogen dispensing rate algorithms.

10 Claims, 1 Drawing Sheet

HYDROGEN DISPENSER WITH USER-SELECTABLE HYDROGEN DISPENSING RATE ALGORITHMS

BACKGROUND OF THE INVENTION

The present invention is directed to hydrogen dispensing. More particularly, the present invention is directed to hydrogen dispensing algorithms for dispensing hydrogen from a source vessel to a receiving vessel.

Hydrogen dispensers for dispensing hydrogen into a receiving vessel are known. Prior art hydrogen dispensers are generally concerned with satisfying users by providing an algorithm for rapidly dispensing hydrogen to the receiving vessel, obtaining a complete and/or accurate fill in the least amount of time. It is desirable to satisfy users of the hydrogen dispenser.

Miller et al., U.S. Pat. No. 5,597,020, disclose a method and apparatus for dispensing natural gas with pressure sensor calibration. Miller et al. disclose that the user can input a total dollar amount of natural gas to be dispensed into his vehicle tank. Alternatively, the user can instruct the system to completely fill the vehicle tank.

Miller et al. state that the flow of natural gas through the sonic nozzle is controlled by a "digital" valve assembly. The valve assembly is referred to as a digital valve because it has only two positions—on and off. There are no intermediate positions typically associated with analog-type valves. The total amount of compressed natural gas dispensed is calculated based on the total cycle time and in accordance with the preprogrammed relation for mass flow through the sonic nozzle, both when the flow was choked and when it was not choked (i.e. subsonic), plus the small amount of natural gas that flows through the nozzle during the valve opening and closing times.

Miller et al. state that the dispensing system shown and described could be also used to dispense hydrogen or propane gas. While the user may have options to select an amount of natural gas dispensed, the user does not have any options for effecting the instantaneous natural gas dispensing rate. The instantaneous natural gas dispensing rate is fixed and controlled by the flow in the sonic nozzle and is not controlled by a programmable controller based on a user selection.

Compressed natural gas (CNG) dispensers are generally not used for dispensing hydrogen. In addition to differing safety issues, the Joule-Thompson effect causes the temperature in the CNG receiving vessel to decrease during dispensing, whereas hydrogen has a reverse Joule-Thompson effect where the temperature in the receiving vessel increases during dispensing. When dispensing CNG, the CNG temperature may decrease below the ambient temperature. The dispensing algorithm compensates for the temperature decrease of the CNG so that as the temperature of the dispensed CNG increases after dispensing, the pressure in the receiving vessel will not exceed the maximum rated pressure. Should this same algorithm be applied to hydrogen, having a reverse Joule-Thompson effect, the final density in the receiving vessel would be much lower than the rated density, resulting in an incomplete fill. Consequently, dispensing algorithms relating to CNG dispensers diverges from dispensing algorithms relating to hydrogen dispensers.

Whereas flow meters are commonly used in CNG dispensers, flow meters are generally not used for dispensing hydrogen. Currently available flow meters may not meet American National Standards Institute (ANSI) standards for dispensing hydrogen. Current methods measure the amount of hydrogen in a receiving vessel before and after filling to determine the amount of hydrogen transferred. The actual cost of the dispensed hydrogen to the customer may be determined after completing hydrogen dispensing. During hydrogen dispensing, a customer (user) does not have an indication of the "running" cost or instantaneous cost as a function of dispensing time.

It would be desirable to provide an estimated cost of hydrogen dispensing prior to dispensing hydrogen.

Those skilled in the art are searching alternative hydrogen dispensing methods.

BRIEF SUMMARY OF THE INVENTION

The present invention provides alternative dispensing methods to the methods utilized in prior art hydrogen dispensing systems.

It has heretofore been unrecognized in the field of hydrogen dispensing, that a single rapid filling algorithm may not satisfy all users. One size may not fit all.

The present inventors have discovered that it would be desirable to present user-selectable alternatives to the user for dispensing hydrogen into a receiving vessel.

The present invention relates to a hydrogen dispenser comprising a programmable controller and a user interface operably connected to the programmable controller. The programmable controller of the present invention has a plurality of user-selectable hydrogen dispensing rate algorithms for dispensing the hydrogen. The user interface offers the plurality of user-selectable hydrogen dispensing rate algorithms for setting a user-selected dispensing rate algorithm from among the plurality of user-selectable hydrogen dispensing rate algorithms.

A first dispensing rate algorithm of the plurality of user-selectable hydrogen dispensing rate algorithms may be programmed to dispense a first quantity of hydrogen at a first time-averaged dispensing rate for a first time period. The first quantity of hydrogen may be intended to effect a first density value in a receiving vessel that is 70% to 90% of the maximum rated density value of the receiving vessel. A second dispensing rate algorithm of the plurality of user-selectable hydrogen dispensing rate algorithms may be programmed to dispense a second quantity of hydrogen at a second time-averaged dispensing rate for a second time period. The second quantity of hydrogen may be intended to effect a second density value in the receiving vessel that is 90% to 100% of the maximum rated density of the receiving vessel. The first time period is less than the second time period, the first time-averaged dispensing rate is greater than the second time-averaged dispensing rate, and the first quantity of hydrogen is less than the second quantity of hydrogen.

The programmable controller may have a time algorithm for calculating an estimated amount of time to complete dispensing for at least one of the plurality of user-selectable hydrogen dispensing rate algorithms. The time algorithm may instruct the programmable controller to send a signal for displaying the estimated amount of time on a display.

At least one of the plurality of user-selectable hydrogen dispensing rate algorithms may dispense for a fixed time. The programmable controller may have a quantity algorithm for calculating an estimated amount of hydrogen to be dispensed for the fixed time. The quantity algorithm may instruct the programmable controller to send a signal for displaying the estimated amount of hydrogen to be dispensed on a display. Alternatively, or in addition, the programmable controller may have a cost algorithm for calculating an estimated cost of hydrogen to be dispensed for the fixed-time. The cost algorithm may instruct the programmable controller to send a signal for displaying the estimated cost of hydrogen to be dispensed on a display.

The hydrogen dispenser may comprise at least one flow regulator operably connected to the programmable controller. The at least one flow regulator is responsive to at least one of the plurality of user-selectable hydrogen dispensing rate algorithms. As used herein, a flow regulator encompasses devices that provide flow rate control as well as pressure ramp rate control.

The programmable controller may further comprise a means for receiving a temperature sensor signal from a temperature sensor. The temperature sensor may measure temperature of the hydrogen in a receiving vessel. In this instance, at least one of the plurality of user-selectable hydrogen dispensing rate algorithms is responsive to the temperature sensor signal.

The programmable controller may further comprise a means for receiving a pressure sensor signal from a pressure sensor. The pressure sensor may measure pressure in a receiving vessel. In this instance, at least one of the plurality of user-selectable hydrogen dispensing rate algorithms is responsive to the pressure sensor signal.

The programmable controller may further comprise a means for receiving a densitometer signal from a densitometer. The densitometer may measure density in a receiving vessel. In this instance, at least one of the plurality of user-selectable hydrogen dispensing rate algorithms is responsive to the densitometer signal.

DETAILED DESCRIPTION OF THE INVENTION

Figure 1:
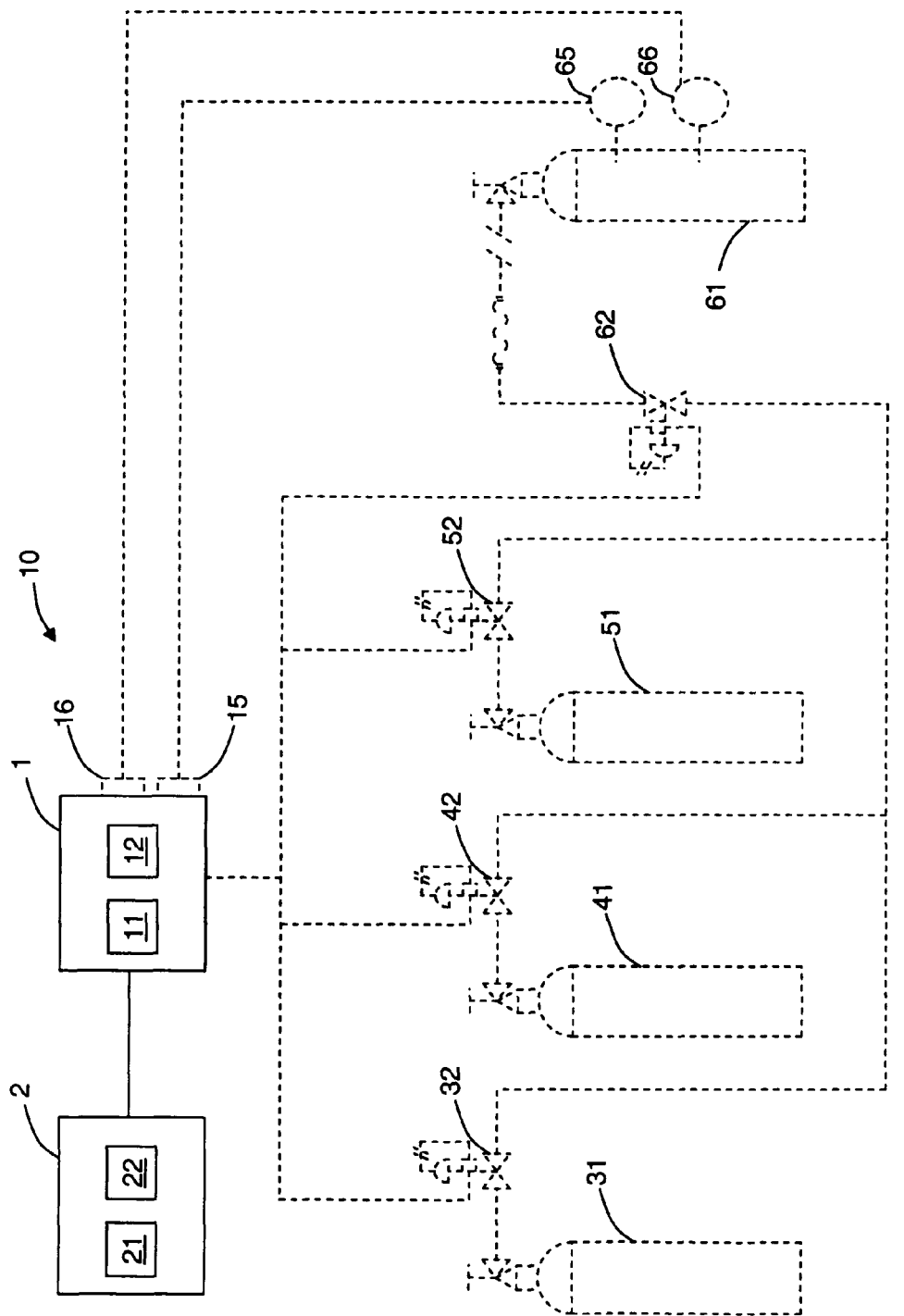
FIG. 1 is a schematic of a hydrogen dispenser and a receiving vessel.

The present invention relates to a hydrogen dispenser comprising a programmable controller and a user interface operably connected to the programmable controller. The programmable controller of the present invention has a plurality of user-selectable hydrogen dispensing rate algorithms. The user interface offers the plurality of user-selectable hydrogen dispensing rate algorithms and is used for setting a user-selected dispensing rate algorithm from among the plurality of user-selectable hydrogen dispensing rate algorithms.

As defined herein, hydrogen is a fluid comprising molecular hydrogen and up to 5 volume % impurities. The hydrogen that is dispensed may be a pressurized gas or supercritical fluid. A pressurized gas is a gas above atmospheric pressure, below its critical pressure, and below its critical temperature. A supercritical fluid is a fluid above its critical pressure and/or its critical temperature. Hydrogen may be stored in a hydrogen source vessel as a liquid, pressurized gas, supercritical fluid, metal hydride, and/or chemical hydride.

A hydrogen dispenser is a device for dispensing, fueling, refueling, or otherwise delivering hydrogen to a receiving vessel. Hydrogen dispensers for dispensing hydrogen are known in the art. For example, hydrogen dispensers for dispensing to hydrogen (fuel cell) vehicles are known. Known hydrogen dispenser designs and/or hydrogen dispensers may be modified and/or otherwise adapted, for example computer programmed, to include the features of the present invention without undue experimentation. The hydrogen dispenser may be mobile or immobile. The hydrogen dispenser may include customary related equipment, for example a hydrogen source, sensors, valves, piping, hoses, nozzles, etc. The hydrogen dispenser may be configured to dispense hydrogen to one or more receiving vessels at the same time. The hydrogen dispenser may include conventional features, for example, payment, telemetry, and authorization features.

The hydrogen dispenser may be capable of providing dispensing with communication, a so-called "communication fill" and/or dispensing without communication, a so-called "non-communication fill."

Dispensing with communication is defined as dispensing where sensor signals from the receiving vessel are transmitted to the programmable controller of the hydrogen dispenser. When dispensing with communication, sensor signals associated with the hydrogen dispenser in addition to sensor signals from the receiving vessel may be used. Sensor signals may be from one or more pressure sensors, temperature sensors, and densitometers.

Dispensing without communication is defined as dispensing where no sensor signals from the receiving vessel are utilized by the programmable controller of the hydrogen dispenser for dispensing hydrogen.

A programmable controller is a device capable of receiving input signals, using the input signals in an algorithm, and sending an output signal resulting from the algorithm. Programmable controllers are well-known in the art. A programmable controller may be one or more programmable logic controllers (PLCs), computers, and the like.

An algorithm is any step-by-step procedure used by the programmable controller for accomplishing some result.

A user interface is a device for entering information by a user. The user interface may be any input device known in the art for entering information, for example, a touch screen, keypad, keyboard, one or more multiple position switches, computer mouse, trackball, push buttons, or voice activated device.

A user is a person and may be a customer associated with a receiving vessel and/or an attendant/operator associated with the hydrogen dispenser.

As used herein, plurality means two or more.

A display is any electronic device (as a cathode-ray tube or liquid crystal display) that temporarily presents information in visual form.

A hydrogen dispensing rate may be a quantity-based rate or a pressure increase-based rate. A quantity-based hydrogen dispensing rate is a quantity of hydrogen dispensed per unit of time. The quantity may be expressed in terms of mass, moles, volume, or their equivalents. A pressure increased-based rate may be expressed as pressure increase per unit time and is also referred to as pressure ramp rate.

A hydrogen dispensing rate algorithm is an algorithm used by a programmable controller for effecting the instantaneous hydrogen dispensing rate during dispensing. The dispensing rate may be constant during dispensing or vary as a function of time, receiving vessel pressure, receiving vessel temperature, hydrogen density in the receiving vessel, hydrogen source pressure, hydrogen source temperature, and/or other operating parameter according to the algorithm.

A time-averaged dispensing rate is calculated from the equation:

$$\bar{\xi} = \frac{1}{\tau} \int_0^\tau \xi(t) dt$$

where $\bar{\xi}$ is the time-averaged dispensing rate, $\xi$ is the instantaneous hydrogen dispensing rate, t is time, and $\tau$ is the total dispensing time.

The term "user-selectable" means that the user may select from preset alternatives or enter values, such as the time to complete dispensing or a value for the pressure ramp rate. User-selectable differs from "user-programmable," in that user-programmable requires entering of programming code by the user.

A user-selectable hydrogen dispensing rate algorithm is hydrogen dispensing rate algorithm that is user-selectable.

Referring to FIG. 1, a hydrogen dispenser 10 comprising a programmable controller 1 and a user interface 2 operably connected to the programmable controller 1 is shown. The programmable controller has a plurality of user-selectable hydrogen dispensing rate algorithms, for example two user-selectable hydrogen dispensing rate algorithms represented by 11 and 12. The user interface offers the plurality of user-selectable hydrogen dispensing rate algorithms, shown for example in FIG. 1 as push buttons 21 and 22. For example, when a user pushes push button 21, the dispensing rate algorithm 11 may be activated and when a user pushes push button 22, dispensing rate algorithm 12 may be activated. The user interface may be operably connected by hardwiring, as shown in FIG. 1, and/or wireless means (not shown).

The plurality of user-selectable hydrogen dispensing rate algorithms may include a first dispensing rate algorithm. The first dispensing rate algorithm may be programmed to dispense a first quantity of hydrogen at a first time-averaged dispensing rate for a first time period. The first dispensing rate algorithm may be a fast dispensing rate algorithm that provides somewhat less than the maximum rated density value of a receiving vessel. For example, a time-averaged dispensing rate, e.g. pressure ramp rate, of 25 MPa/min. to 35 MPa/min. may be used to provide 70% to 90% of the maximum rated density value of the receiving vessel. Dispensing to an initially nearly empty 35 MPa receiving vessel may take about 1 minute to complete.

The fast dispensing rate algorithm may be the fastest possible without overheating the receiving vessel. An empirical equation for a maximum allowed temperature of 85° C. and an ambient temperature of 26° C. that relates the maximum pressure ramp rate to process conditions is:

$$RR = \exp\left[\frac{\left(22209 - \frac{9314.64*PRR}{(0.8175*PRR+0.1187)}\right)}{(FT+273.15)} - 35.0156\right]$$

where PRR is the pressure rise ratio (DP/SP) where DP is the design system pressure of the receiving vessel and SP is the initial pressure in the receiving vessel before dispensing, and FT is the temperature of the hydrogen being dispensed.

The instantaneous dispensing rate e.g. pressure ramp rate, may be constant during dispensing or vary during dispensing.

The maximum rated gas density value may be calculated based on the receiving vessel specifications, for example, a manufacturer's specification, for a full vessel. Vessel rated pressure and temperature may be converted to a vessel rated density. Independent of how a receiving vessel is rated, it may be converted to a maximum rated density value for the purposes of this invention. For example, a hydrogen storage vessel that is rated at 35 MPa @ 15° C. has a rated density of 0.02408 g/cm$^3$.

The plurality of user-selectable hydrogen dispensing rate algorithms may include a second dispensing rate algorithm.

The second dispensing rate algorithm may be programmed to dispense a second quantity of hydrogen at a second time-averaged dispensing rate for a second time period. The second dispensing rate algorithm may be a full fill dispensing rate algorithm that provides nearly the maximum rated density value of a receiving vessel, but over a longer dispensing time as compared to the fast dispensing rate algorithm. For example, a time-averaged dispensing rate, e.g. pressure ramp rate, of 2.5 MPa/min. to 25 MPa/min. may be used to provide 90% to 100% of the receiving vessel density capacity. Dispensing to an initially nearly empty 35 MPa receiving vessel may take about 10 minutes to complete. The pressure ramp rate may be constant during dispensing or vary during dispensing.

The first time period for the first (fast) dispensing rate algorithm is less than the second time period for the second (full fill) dispensing rate algorithm, the first time-averaged dispensing rate for the first (fast) dispensing rate algorithm is greater than the second time-averaged dispensing rate for the second (full fill) dispensing rate algorithm, and the first quantity of hydrogen for the first (fast) dispensing rate algorithm is less than the second quantity of hydrogen for the second (full fill) dispensing rate algorithm.

The programmable controller may receive signals associated with dispensing with communication including the volume of the receiving vessel. Alternatively, the user may enter values associated with the receiving vessel including the volume of the receiving vessel. The programmable controller may have a time algorithm for calculating an estimated amount of time to complete dispensing by the selected dispensing rate algorithm and display the estimated amount of time on a display (not shown), which is operably connected to the programmable controller 1. The programmable controller may have a cost algorithm for calculating an estimated cost of hydrogen to be dispensed for the selected dispensing rate algorithm and display the estimated cost.

At least one of the plurality of user-selectable hydrogen dispensing rate algorithms may dispense for a fixed time, for example 1 minute, 2 minutes, 3 minutes and/or 10 minutes, without any dependence on the completeness of fill of the receiving vessel. The programmable controller may have a built-in clock for dispensing for a fixed time. The programmable controller may have an algorithm for calculating an amount of hydrogen estimated to be dispensed for each of the fixed times offered and display the estimated amount on a display (not shown). Alternatively, or in addition, the programmable controller may calculate an estimated cost for hydrogen dispensing for the various user-selectable hydrogen dispensing rate algorithms.

The programmable controller may consider several dispensing strategies for the fixed time selected or entered by the user, and choose the one that provides the most complete accumulation of hydrogen in the receiving vessel for that fixed time. The dispensing strategies considered may include a constant pressure ramp rate for the selected fixed time or a varied pressure ramp rate during the selected fixed time. Various strategies for hydrogen dispensing may be used and are not critical to the present invention. However, a flow and/or pressure ramp rate strategy providing the greatest quantity of gas to be dispensed in the selected time interval would be good practice.

Good practice would also include dispensing rate algorithms that do not allow the temperature and/or pressure in the vessel to exceed design limits. Thermodynamic calculations and an equation of state may be used to predict the temperature variation during a fill, empirical relationships may be developed, or the temperature in the receiving vessel may be monitored by a probe or sensor.

The plurality of user-selectable hydrogen dispensing rate algorithms may be in any programming language known in the art. Typical programming languages include C, C++, and ladder logic.

The station operator may limit and/or modify the plurality of user-selectable hydrogen dispensing rate algorithms depending on how busy the station is (how many instant customers or rate of customers are using the hydrogen dispenser) or depending on the time of day or night, or depending on the hydrogen inventory quantity and/or pressure. For example, if the station is busy, the station operator may limit the dispensing options to those taking less than a set time, for example, 3 minutes. If certain times of the day are busier than others, the hydrogen dispenser may be automatically set to limit the dispensing options to those taking less than a set time. For example, if the busiest times of day are 7:00 a.m. to 9:00 a.m. and 5.00 p.m. to 7:00 p.m., the hydrogen dispenser may be set to limit the dispensing options to those taking less than 3 minutes during those times of day. During other times of the day the hydrogen dispenser may be set to limit the dispensing options to those taking 10 minutes or less. The day may be broken up into any number of time periods so as to vary the user-selectable hydrogen dispensing rate algorithms offered according to the wishes of the station operator.

The hydrogen for dispensing may be provided by any known hydrogen source, for example hydrogen cylinders, shown as hydrogen cylinders 31, 41, and 51 in FIG. 1, and/or liquefied gas and associated vaporizers (not shown), metal hydrides (not shown), and/or chemical hydrides (not shown). Although three hydrogen cylinders are shown as a hydrogen source, any number of source vessels may be used as desired.

Flow from the hydrogen source may be regulated by any flow regulator known in the art, for example flow control valves and/or pressure control valves. As shown in FIG. 1, flow and/or pressure control valves 32, 42, 52, and 62 regulate the flow from the hydrogen source to a receiving vessel 61. Flow and/or pressure control valves may be pneumatically, hydraulically, or electrically actuated. The hydrogen dispenser may be configured to dispense to more than one receiving vessel at a time. The receiving vessel 61 may be part of a mobile vehicle, for example, a hydrogen storage vessel on a hydrogen-powered vehicle. Flow and/or pressure control valves 32, 42, 52, and 62 may be activated by the programmable controller 1 to perform the plurality of user-selectable hydrogen dispensing rate algorithms. In case hydrogen cylinders 31, 41 and 51 are at different pressures, so-called cascading may be employed, a technique known in the art of hydrogen filling systems.

As shown in FIG. 1, the programmable controller 1 may further comprise a means for receiving a temperature sensor signal 15 from a temperature sensor 65 which measures temperature in a receiving vessel 61. The means for receiving the temperature sensor signal 15 may comprise a hard-wired connection as shown or wireless receiver (not shown). At least one of the plurality of user-selectable hydrogen dispensing rate algorithms may be responsive to the temperature sensor signal.

As shown in FIG. 1, the programmable controller 1 may further comprise a means for receiving a pressure sensor signal 16 from a pressure sensor 66 which measures pressure in a receiving vessel 61. The means for receiving the pressure sensor signal 16 may comprise a hard-wired connection as shown or wireless receiver (not shown). At least one of the plurality of user-selectable hydrogen dispensing rate algorithms may be responsive to the pressure sensor signal.

The quantity of gas in the receiving vessel may be determined by any means known in the art. The quantity of gas in the receiving vessel of a known volume may be determined before and after dispensing by measuring the pressure and temperature in the receiving vessel and calculating using an appropriate equation of state for the gas. Other means for determining the quantity of gas in the receiving vessel, for example direct density measurements, are also known in the art.

The hydrogen dispenser according to the present invention may be used in a manner similar to other hydrogen dispensers with an additional step where the user selects from a number of hydrogen dispensing rate options.

Although illustrated and described herein with reference to specific embodiments, the present invention nevertheless is not intended to be limited to the details shown. Rather, various modifications may be made in the details within the scope and range of equivalents of the claims without departing from the spirit of the invention.

We claim:

1. A hydrogen dispenser comprising: a programmable controller having a plurality of user-selectable hydrogen dispensing rate algorithms for dispensing the hydrogen, the plurality of user-selectable hydrogen dispensing rate algorithms used by the programmable controller for effecting instantaneous hydrogen dispensing rate during dispensing; and a user interface offering the plurality of user-selectable hydrogen dispensing rate algorithms, the user interface operably connected to the programmable controller for setting a user-selected dispensing rate algorithm from among the plurality of user-selectable hydrogen dispensing rate algorithms; wherein the plurality of user-selectable hydrogen dispensing rate algorithms are user-selectable wherein a user enters information into the user interface to select from preset alternative hydrogen dispensing rate algorithms or enters a value for the hydrogen dispensing rate algorithm; and wherein the plurality of user-selectable hydrogen dispensing rate algorithms comprises a first dispensing rate algorithm programmed to dispense a first quantity of hydrogen at a first time-averaged dispensing rate for a first time period and a second dispensing rate algorithm programmed to dispense a second quantity of hydrogen at a second time-averaged dispensing rate for a second time period, wherein the first time period is less than the second time period, the first time-averaged dispensing rate is greater than the second time-averaged dispensing rate, and the first quantity of hydrogen is less than the second quantity of hydrogen.

2. The hydrogen dispenser of claim 1 wherein the first quantity of hydrogen is intended to effect a first density value in a receiving vessel that is 70% to 90% of the maximum rated density value of the receiving vessel and the second quantity of hydrogen is intended to effect a second density value in the receiving vessel that is 90% to 100% of the maximum rated density value of the receiving vessel.

3. The hydrogen dispenser of claim 1 wherein the programmable controller has a time algorithm for calculating an estimated amount of time to complete dispensing for at least one of the plurality of user-selectable hydrogen dispensing rate algorithms and sending a signal for displaying the estimated amount of time on a display for the at least one of the plurality of user-selectable hydrogen dispensing rate algorithms.

4. The hydrogen dispenser of claim 1 wherein at least one of the plurality of user-selectable hydrogen dispensing rate algorithms dispenses for a fixed time.

5. The hydrogen dispenser of claim 4 wherein the programmable controller has a quantity algorithm for calculating an estimated amount of hydrogen to be dispensed for the fixed time and sending a signal for displaying the estimated amount of hydrogen to be dispensed on a display.

6. The hydrogen dispenser of claim 4 wherein the programmable controller has a cost algorithm for calculating an estimated cost of hydrogen to be dispensed for the fixed time and sending a signal for displaying the estimated cost of hydrogen to be dispensed on a display.

7. The hydrogen dispenser of claim 1 further comprising:
at least one flow regulator operably connected to the programmable controller responsive to at least one of the plurality of user-selectable hydrogen dispensing rate algorithms.

8. The hydrogen dispenser of claim 1 wherein the programmable controller further comprises a means for receiving a temperature sensor signal from a temperature sensor measuring temperature in a receiving vessel and wherein at least one of the plurality of user-selectable hydrogen dispensing rate algorithms is responsive to the temperature sensor signal.

9. The hydrogen dispenser of claim 1 wherein the programmable controller further comprises a means for receiving a pressure sensor signal from a pressure sensor measuring pressure in a receiving vessel and wherein at least one of the plurality of user-selectable hydrogen dispensing rate algorithms is responsive to the pressure sensor signal.

10. The hydrogen dispenser of claim 1 wherein the programmable controller further comprises a means for receiving a densitometer signal from a densitometer measuring density in a receiving vessel and wherein at least one of the plurality of user-selectable hydrogen dispensing rate algorithms is responsive to the densitometer signal.

* * * * *